(12) United States Patent
Belford (10) Patent No.: US 11,703,889 B2
(45) Date of Patent: Jul. 18, 2023

(54) FLOW REGULATOR FOR AN IRRIGATION SYSTEM

(71) Applicant: NETAFIM, LTD., Tel Aviv (IL)

(72) Inventor: Lorne Moshe Belford, Kibbutz Magal (IL)

(73) Assignee: NETAFIM, LTD., Tel Aviv (IL)

( * ) Notice: Subject to any disclaimer, the term of this patent is extended or adjusted under 35 U.S.C. 154(b) by 0 days.

(21) Appl. No.: 17/897,345

(22) Filed: Aug. 29, 2022

(65) Prior Publication Data

US 2022/0413520 A1    Dec. 29, 2022

Related U.S. Application Data

(63) Continuation-in-part of application No. PCT/IB2021/051498, filed on Feb. 23, 2021.

(60) Provisional application No. 62/985,664, filed on Mar. 5, 2020.

(51) Int. Cl.
    *G05D 7/01* (2006.01)
    *F16K 31/383* (2006.01)

(52) U.S. Cl.
    CPC ......... *G05D 7/0133* (2013.01); *F16K 31/383* (2013.01)

(58) Field of Classification Search
    CPC .... G05D 7/0133; G05D 16/10; F16K 31/383; A01G 25/02
    See application file for complete search history.

(56) References Cited

U.S. PATENT DOCUMENTS

| 2,986,157 | A |   | 5/1961  | Dollison |
|-----------|---|---|---------|----------|
| 3,752,184 | A | * | 8/1973  | Griswold ............. G05D 7/0133 137/625.3 |
| 4,226,368 | A |   | 10/1980 | Hunter |
| 5,232,160 | A | * | 8/1993  | Hendrickson ......... B05B 15/622 239/444 |
| 5,383,489 | A | * | 1/1995  | Golestan ............. G05D 7/0133 137/504 |
| 8,439,282 | B2 | * | 5/2013  | Allen ................... A01G 25/023 239/570 |

(Continued)

FOREIGN PATENT DOCUMENTS

EP    2940548 A1 * 11/2015 ........... G05D 7/0106

OTHER PUBLICATIONS

International Search Report dated May 6, 2021, in counterpart International (PCT) Application No. PCT/162021/051498.

(Continued)

*Primary Examiner* — Jessica Cahill
(74) *Attorney, Agent, or Firm* — Womble Bond Dickinson (US) LLP (57) ABSTRACT

A flow regulator for regulating a flow rate of water within at least a section of a water system, such as an irrigation system, includes a base member and piston member. The piston member is movable relative to the base member and includes at least one notch through which water can flow when passing through the flow regulator. Movement of the piston member towards and away from the base member, respectively, decreases and increases an area of the notch through which water can flow. An orifice member detachably coupled to the piston member and having an orifice member aperture through which all water flowing through the flow regulator must pass limits the cross-sectional area of an interior water passage within the piston member.

22 Claims, 7 Drawing Sheets

(56) References Cited

U.S. PATENT DOCUMENTS

| | | |
|---|---|---|
| 2005/0211305 A1 | 9/2005 | Kirchner et al. |
| 2006/0021657 A1 | 2/2006 | Cherfane et al. |
| 2006/0144965 A1* | 7/2006 | Keren .................. A01G 25/02 |
| | | 239/542 |
| 2010/0200676 A1 | 8/2010 | Allen et al. |
| 2010/0281997 A1* | 11/2010 | Jones, III ............. G05D 7/0133 |
| | | 137/538 |
| 2014/0014202 A1* | 1/2014 | Keren ................. F16K 31/1268 |
| | | 137/510 |

OTHER PUBLICATIONS

Written Opinion dated May 6, 2021, in counterpart International (PCT) Application No. PCT/182021/051498.

* cited by examiner

FLOW REGULATOR FOR AN IRRIGATION SYSTEM

RELATED APPLICATIONS

This is a Bypass Continuation-in-Part of International Application No. PCT/IB2021/051498 filed Feb. 23, 2021, which claims priority to U.S. Provisional Patent Application No. 62/985,664 filed Mar. 5, 2020. The contents of the aforementioned applications are incorporated by reference in their entirety.

TECHNICAL FIELD

Embodiments of the invention relate to a flow regulator, in particular for use in irrigation application.

BACKGROUND

Flow regulators are commonly used for regulating liquid flow within irrigation systems. Such flow regulators can vary from simple orifices to more complex hydraulic networks that can compensate for changes in pressure.

U.S. Pat. No. 2,986,157 for example describes a pilot valve that can be used for opening and closing valves in response to pressure. The pilot valve includes relatively small passageways through which hydraulic pressure can be used for controlling the control valve.

Flow regulators used in irrigation systems that channel relatively dirty water, should preferably include relatively large passageways so that they will not clog easily and consequently function as designed for regulating flow.

SUMMARY

The following embodiments and aspects thereof are described and illustrated in conjunction with systems, tools and methods which are meant to be exemplary and illustrative, not limiting in scope.

In an embodiment of the present invention there is provided a flow regulator for regulating a flow rate of water within at least a section of a water system, for example an irrigation system, the flow regulator comprising a base member and piston member that is movable relative to the base member, the piston member comprises at least one notch through which water can flow when passing through the flow regulator, wherein movement of the piston member towards and away from the base member is adapted to, respectively, decrease and increase an area of the notch through which water can flow.

Preferably, the piston member comprises an opening upstream to the notch through which water first passes.

Typically, water flowing through the flow regulator cannot bypass the at least one notch and/or opening into the piston member.

Preferably, the at least one notch provides a passage therethrough that gradually decreases from a beginning where the notch is deeper to an end where the notch is shallower. Such gradual decrease may be defined as following a substantial helical route that spirals about at least a section of the piston member.

Preferably, the piston member comprises a generally cylindrical shape that is hollow along at least a portion of its axis thus forming a peripheral shroud, and the at least one notch is formed at a downstream side of the shroud.

Preferably, movement of the piston member towards and away from the base member is affected by water pressure existing upstream and downstream to an entry into the piston member.

Such movement actions within the flow regulator ignited by pressure existing upstream and downstream to the piston member, in particular an opening into the piston member, provides a so-called direct flow regulation that can be characterized as having relative high response rates suitable for relative short operation cycles and/or short stabilization times, typical to at least some irrigation actions such as filtration actions with which the flow regulation can be used.

Preferably, the relatively large water passages provided through the flow regulator provide relatively high reliability of operation with dirty water, thus substantially reducing likelihood of blocking of the regulator during use.

Typically, the self-regulating movements provided in the flow regulator during operation permit substantially constant change of passage sizes through the regulator that assist in removal of debris/dirt that may get caught within water passages of the regulator.

For example, dirt caught within a notch of the flow regulator, that may be defined as representing the smallest passage through the regulator, may be released from said position at the notch to flow downstream as downstream pressure rises and urges the piston member to move away from the base member.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which:

FIGS. 3A to 3C schematically show different views of a piston member of the flow regulator of FIG. 2;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1A:
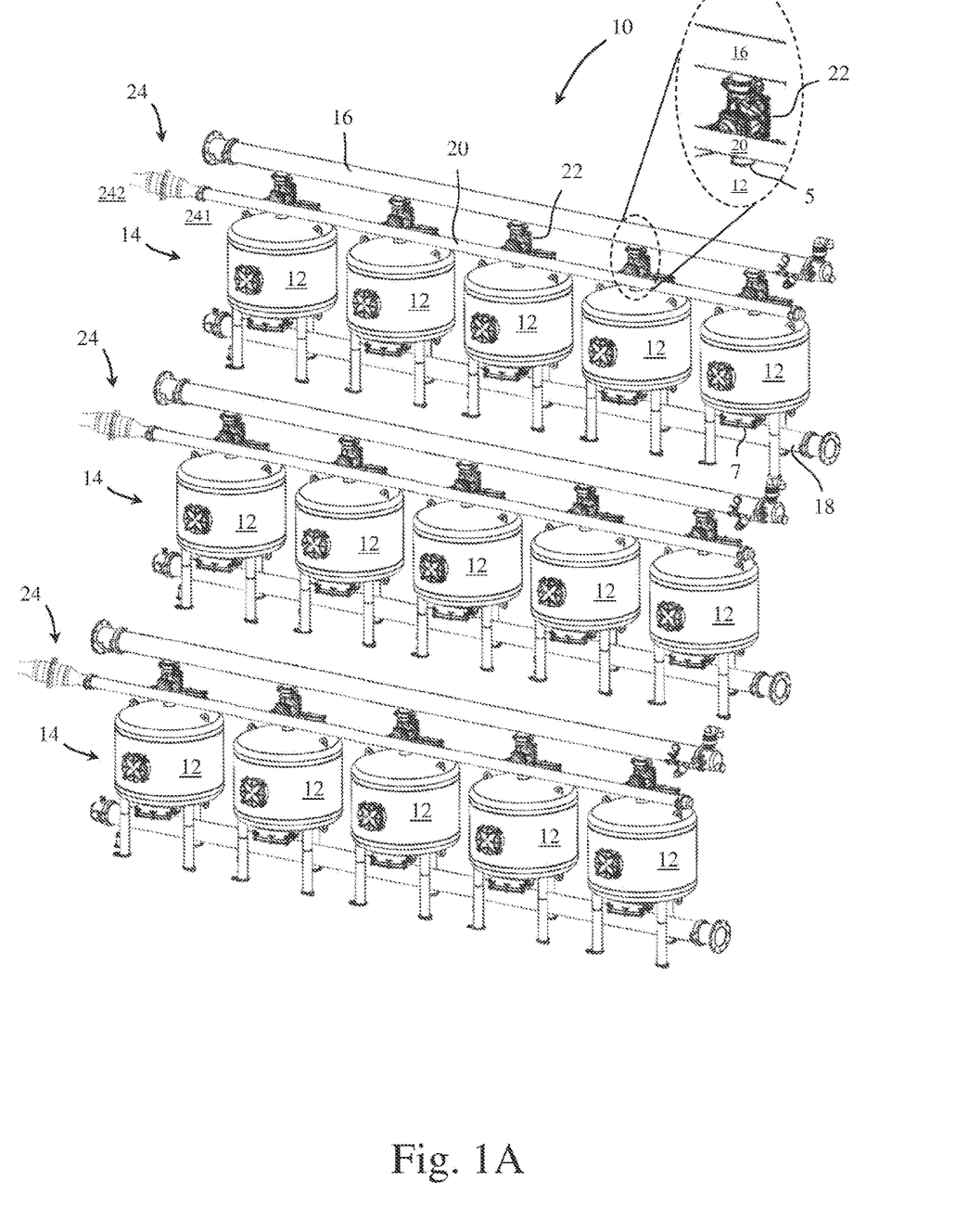
FIGS. 1A and 1B schematically show, respectively, a filtration setup possibly at an upstream side of an irrigation system including flow regulators in accordance with an embodiment of the present invention; and an irrigation system, possibly for use in flood irrigation, utilizing flow regulators in accordance with an embodiment of the present invention.

Attention is first drawn to FIG. 1A illustrating a possible filtration setup 10 that may be located at an upstream side of an irrigation system. The filtration setup in this example includes a plurality of media filters 12. The filtering setup may be arranged in groups 14 (here three such groups) each including several media filters 12 (here five).

Each group 14 within the filtration setup may include an incoming pipe 16, an outgoing pipe 18 and a flushing pipe 20. Each media filter 12 may be coupled at its upper side 5 via a three-way valve 22 to the incoming and flushing pipes 16, 20; and at its lower side 7 to the outgoing pipe 18.

During a filtering cycle of a given filter, the three-way valve associated with the filter can be controlled to open a flow path for water arriving from the incoming pipe 16 to flow into the filter via its upper side 5 (while blocking a route to the flushing pipe 20). The water flowing downwards through the media within the filter can then be emitted out of the filter at its lower side 7 into the outgoing pipe 18 and from there possibly onwards downstream to irrigate a field (or the like).

During a flushing cycle of a given filter, the three-way valve associated with the filter can be controlled to open a flow path between the filter's upper side 5 and the flushing pipe 20 (while blocking a route to the incoming pipe 16). Pressurized water present within the outgoing pipe 18 can then flow upwards into the filter via its lower side 7 to flush dirt out of the media within the filter, and then flow out through the upper side 5 of the filter to flushing pipe 20 and from there onwards to a reservoir, the ambient environment or any other means suitable for receiving such relative dirty water.

Pressurized water within the outgoing pipe 18 suitable for powering a flushing cycle of a media filter, may be obtained by controlling the three-way valves of all but one of the media filters to perform a filtering cycle—while a remaining one of the filters can be controlled via its three-way valve to perform a flushing cycle. Thus, the majority of the water being filtered by the media filters can be used for their intended purpose (e.g., irrigation) while a small portion can be harnessed for flushing one of the media filters.

In an aspect of the present invention, an embodiment of a flow regulator 24 may be fitted to a downstream side of each flushing pipe 20. The flow regulator 24 may be aimed at regulating the flow rate of water passing through the flushing pipe during a flushing cycle of a filter, to a suitable flow rate range that is substantially optimized for flushing dirt out of the media within the filter, while substantially avoiding or limiting loss of media particles from being flushed out of the filter together with the water passing therethrough.

Figure 1B:
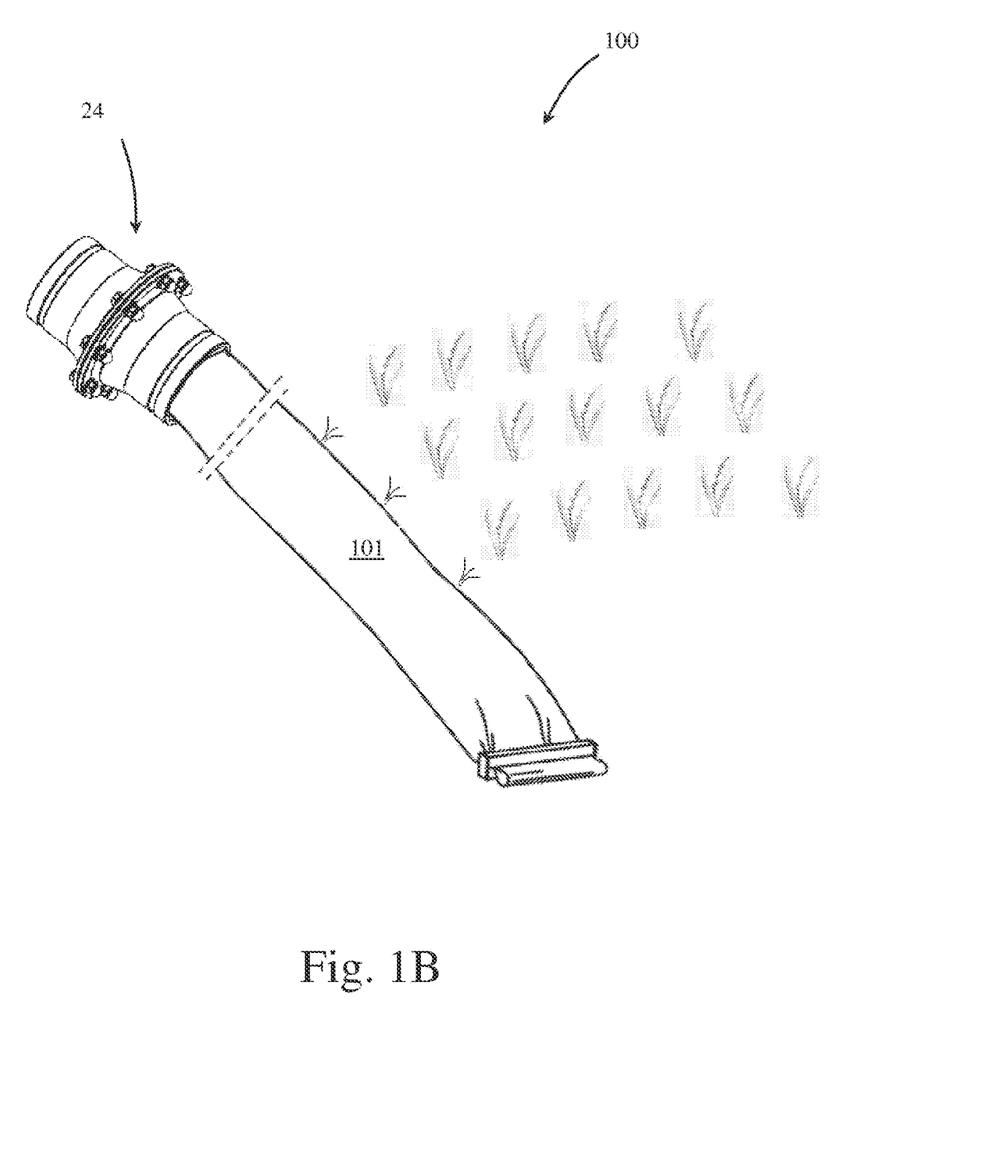

Attention is drawn to FIG. 1B illustrating one other example of a system 100 where embodiments of flow regulator 24 may be fitted. In this example, system 100 is a flood irrigation system suitable for delivering water to a field via a pipe 101 so that the water simply flows over the ground through crops in the field.

Figure 2A:
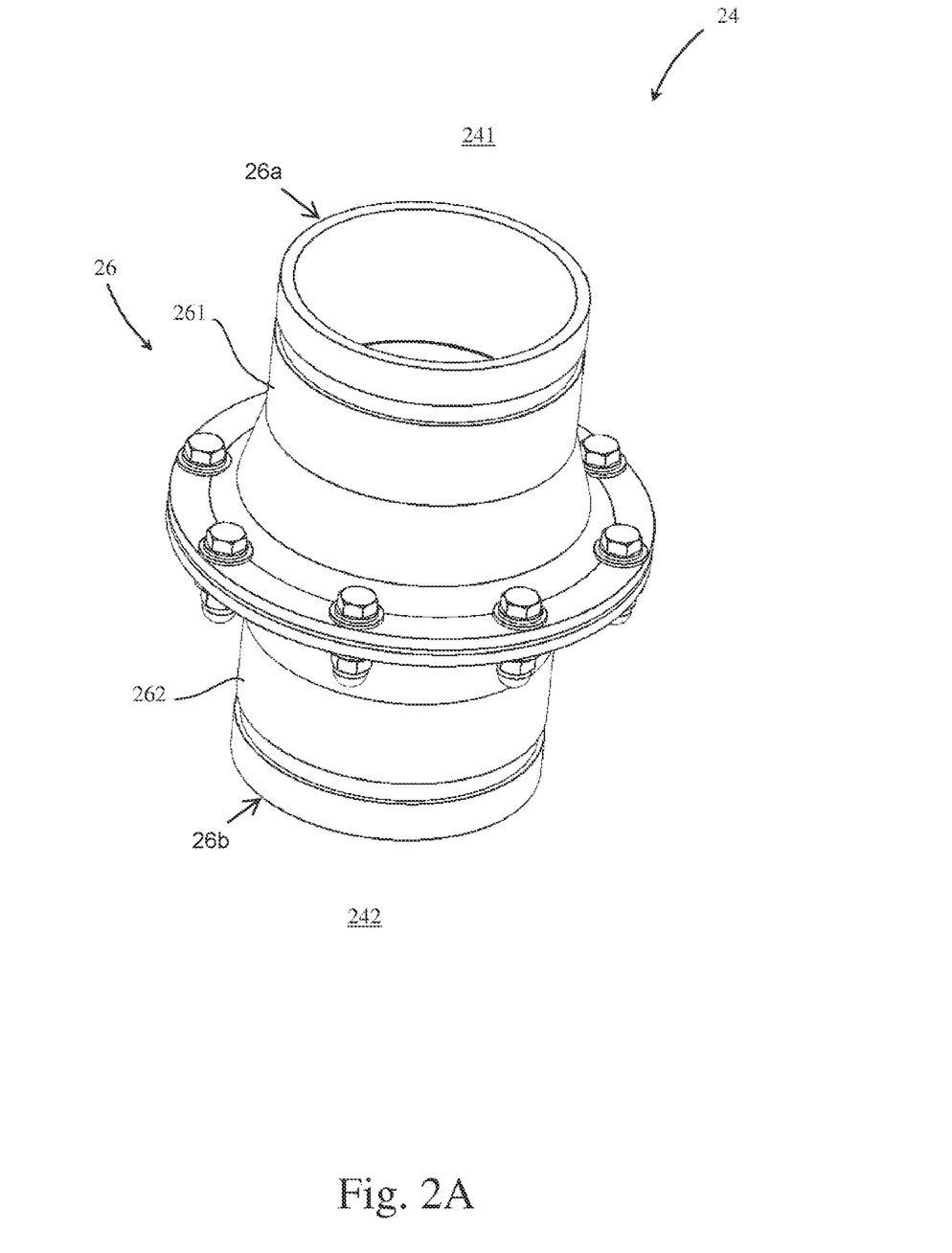
FIGS. 2A and 3B schematically show an embodiment of a flow regulator in assembled and exploded states, respectively.
Figure 2B:
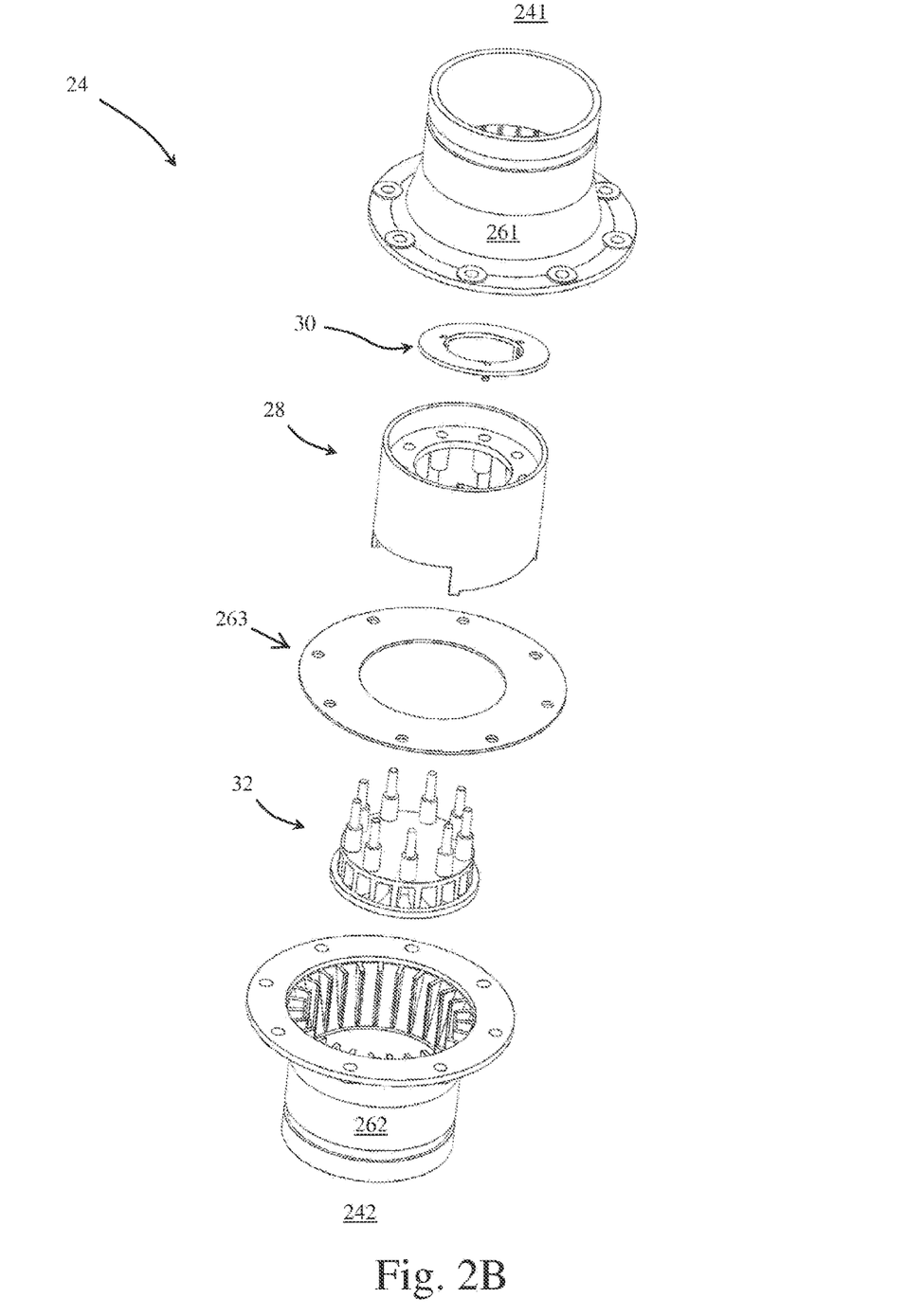

Attention is additionally drawn to FIGS. 2A and 2B illustrating an embodiment of a flow regulator 24 of the present invention. The flow regulator has an upstream side 241 through which water enters the regulator and a downstream side 242 through which water exits the regulator. The flow regulator has an outer housing 26 formed in this example of upstream and downstream portions 261, 262, with a ring-shaped intermediate flange portion 263 between the two. The outer housing 26 has an upstream end 26a associated with the upstream portion 261 and a corresponding downstream end 26b associated with the downstream portion 262. The outer housing encloses the following main elements: a piston member 28, an orifice member 30 and a base member 32.

Figure 3A:
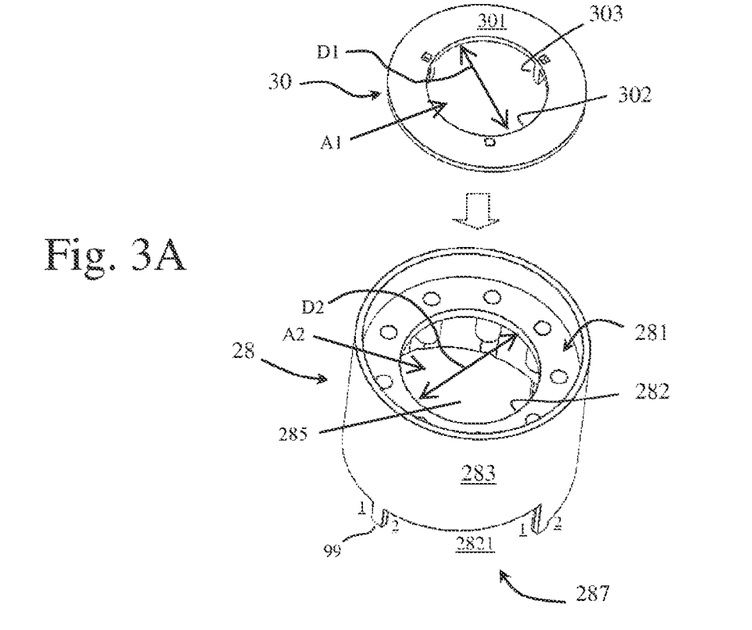
Figure 3B:
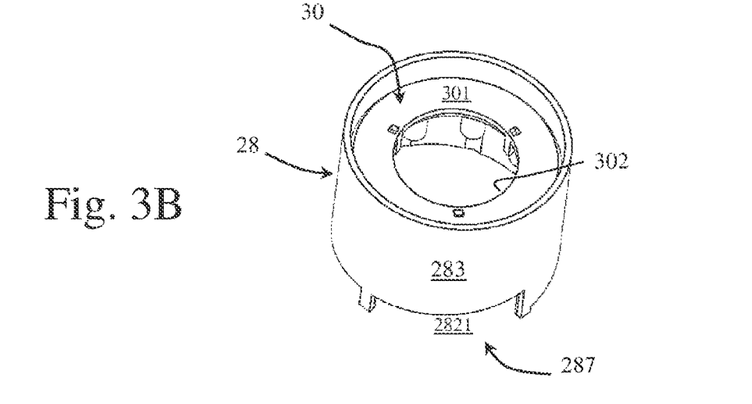
Figure 3C:
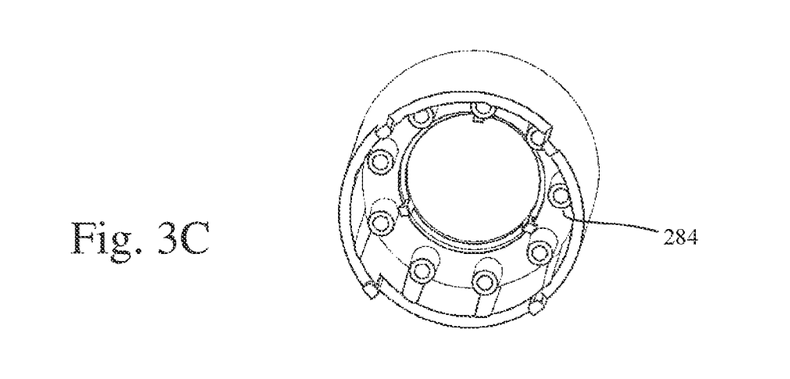

Attention is drawn to FIGS. 3A to 3C for a closer view of the of the piston and orifice members 28, 30. The orifice member 30 includes a generally ring shaped substantially flat orifice face 301 and a through-going aperture 302 ("orifice member aperture 302") that passes through face 301. The orifice member 30 in addition includes coupling members 303, here at its lower downstream side, for coupling it to the piston member. The piston member 28 has a generally cylindrical shape, a flange 281 at a generally upstream side thereof that defines an opening 282 ("piston member opening 282"), and a peripheral shroud 283 that includes a jagged lower side 287 ("lower rim 287") formed of angular notches 2821. Each angular notch 2821 in this example gradually descends (here in a generally linear fashion) in a peripheral direction from a circumferential beginning end 1 where the notch is deeper (has greater height) to a circumferential trailing end 2 where the notch is shallower (has lower height). The height of each notch monotonically decreases (i.e., does not increase) from the circumferential beginning end 1 to the circumferential trailing end 2. In some embodiments, the height of each notch continuously decreases from the circumferential beginning end 1 to the circumferential trailing end 2 the Adjacent notches 2821 in this example are peripherally spaced apart by downwardly projecting partitions 99.

The orifice member 30 can be fitted, possibly snap fitted via its coupling members 303, onto the piston member 28 (see FIG. 3B) to align its aperture 302 with opening 282. The coupling members 303 may be in the form of an elongated tongue provided with a hook for engagement with a complementary structure formed on an interior portion of the piston member 28.

As seen in FIG. 3A, the orifice member aperture 302 has a first cross-sectional area A1, and may be circular with a first diameter D1. Meanwhile, the piston opening aperture 282 has a second cross-sectional area A2, and may be circular with a second diameter D2.

Thus, by fitting an orifice member 30 with a certain sized aperture 302 to a piston of a flow regulator, adjustment of a relatively general purpose flow regulator may be performed so that it can regulate flow passing therethrough to a desired flow rate range suitable e.g., for flushing a certain media filter without substantially losing media particles during such flushing action.

Generally speaking, the second cross-sectional area A2 is at least as large as the first cross-sectional area A1 (A2≥A1) and/or the second diameter D2 is at least as large as the first diameter D1 (D2≥D1). It can be seen that when A2>A1 (or D2>D1), and the orifice member 30 overlays (such as when being removably detached to) the piston member, the orifice member aperture 302 limits the cross-sectional area of the interior water passage (285) within the piston member 28, at least at the piston member opening 282.

As seen in FIG. 3C, the piston member 28 may include a plurality of bore members 284 at a lower downstream side of its flange 281.

Figure 4A:
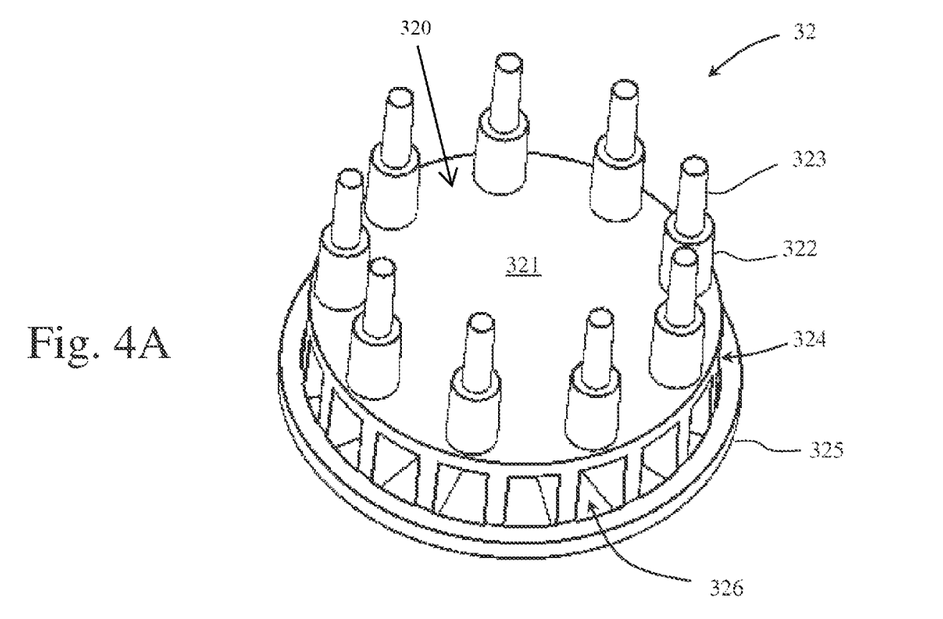
FIGS. 4A and 4B schematically show different views of a base member of the flow regulator of FIG. 2.
Figure 4B:
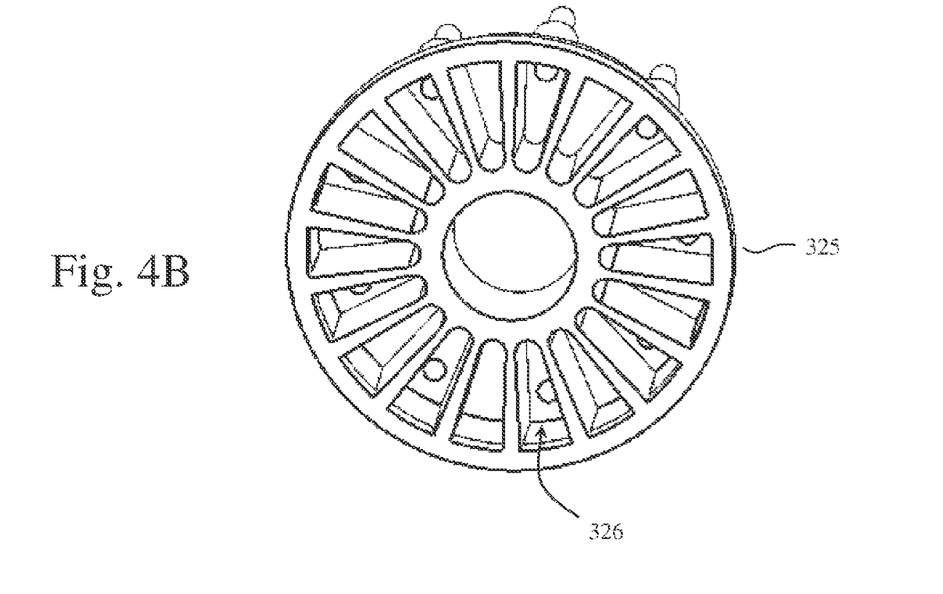

Attention is drawn to FIGS. 4A and 4B for a closer view of base member 32. Base member 32 includes a generally cylindrical core 320 and a plurality of upwardly projecting rests 322 that rise above an upper side 321 of the core. Each rest 322 includes at its upper side a rod 323 of smaller diameter that projects further upwards. The core at its periphery 324 follows a generally cone shape that diverges slightly downwards towards a peripheral rim 325, and the core is formed at its periphery 324 with a plurality of passages 326 that provide each a route that communicates between periphery 324 and a lower side of the base member 32.

Figure 5A:
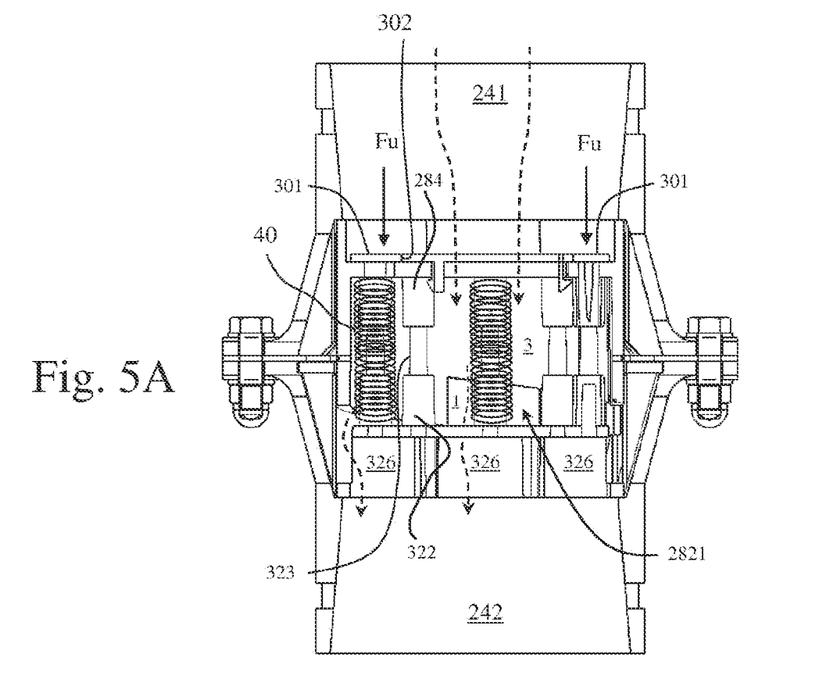
FIGS. 5A and 5B schematically show cross sectional views of the flow regulator of FIG. 2 in different regulating states.
Figure 5B:
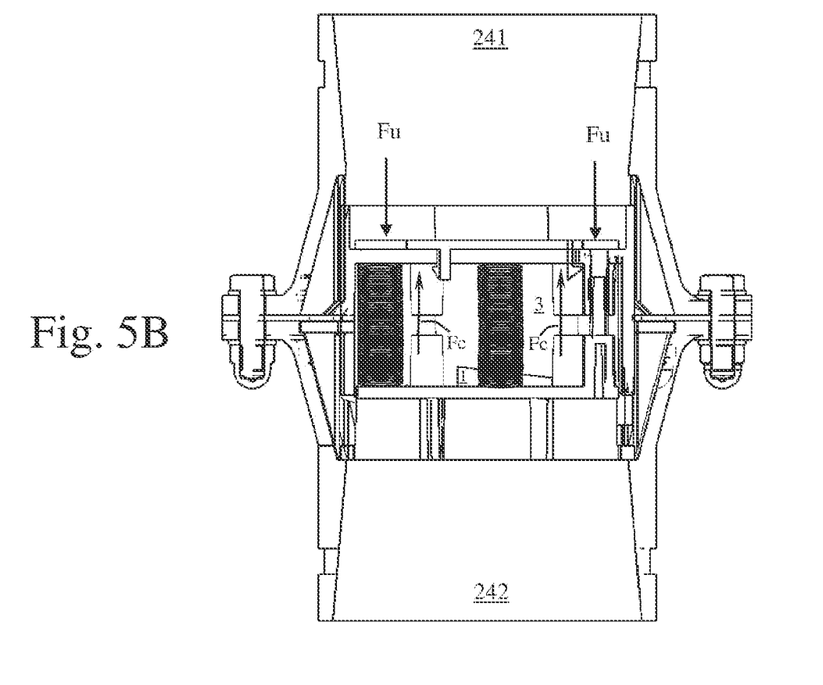

Attention is drawn to FIGS. 5A and 5B providing cross sectional views of the flow regulator during different regulating states. In an assembled state of the flow regulator, the piston member 28 can be placed above the base member 32 with each rod 323 of the base member 32 interacting and being located within a respective bore member 283 of the piston member.

Several biasing members 40, here in form of compression springs, may be placed upon at least some of the rods 323 and their respective bore and rest members 284, 322. Such biasing members 40 may thus be held in between a lower side of the piston's flange 281 and the base member's core 321.

Piston member 28 may be placed above base member 32 with its peripheral shroud 283 adjacent its jagged lower side—generally surrounding periphery 324 of the base member's core 320. The piston and base members in the assembled state form a chamber 3 therebetween that can be exited at its downstream side via the notches 2821 and at its upstream side via aperture 302.

Incoming water entering the flow regulator via its upstream side 241 flows via aperture 302, into chamber 3 and then via the notches 2821 and passages 326—to exit the flow regulator at its downstream side 242. The pressure of water at the upstream side 241 of the flow regulator bears against orifice face 301 of the orifice member, to apply a force Fu that acts to bias piston member 28 towards base member 32.

As the force Fu builds and exceeds, e.g., the counter forces applied by the basing members 40, the piston member moves towards the base member and, by that, gradually/proportionally decrease the area of the notches through which water can flow downstream (see FIG. 5B). As a result, the flow rate of water passing through the flow regulator decreases proportionally while building pressure at a downstream side of aperture 302 (i.e., at chamber 3 located in between aperture 302 and the notches 2821) that forms a combined force Fc (applied by the pressure and springs) that bears against the piston member in the upstream direction.

As the force Fc downstream of aperture 302 overcomes force Fu, the piston member may move back upstream in a direction away from the base member and by that the area of the notches through which water can pass increases, thereby increasing the flow rate through the flow regulator.

The movement of the piston member may thus oscillate between the upstream and downstream directions, due to pressure fluctuations upstream and downstream of the piston and by that regulate the flow rate of water passing through the flow regulator within a given flow rate range defined by dimensions of the flow regulator and the diameter 302 of the detachable orifice member. By this, an optimal flow rate range suitable for performing a flushing action of a media filter may be obtained.

In an aspect of the present invention, a given flow regulator 24 may be adjusted for different working conditions by suitably choosing its biasing means and in particular the aperture size of its detachable orifice member. For example, a certain sized flow regulator used in a system generally exhibiting a first flow rate, may be equipped with biasing means having a first spring constant and an aperture 302 of a first diameter. A similar flow regulator however when used in different working conditions may be equipped with different type springs and a different aperture diameter.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. A flow regulator for regulating a flow rate of water within at least a section of a water system, the flow regulator comprising:
    a base member;
    a piston member movable relative to the base member, and comprising:
        at least one notch through which water flows when passing through the flow regulator; and
    an orifice member detachably attached to the piston member, the orifice member having an orifice member aperture;
    wherein:
    the at least one notch provides a passage therethrough that continuously decreases in height from a beginning end where the notch is deepest to a terminal end where the notch is shallowest;
    the orifice member is positioned such that water must pass through the orifice member aperture prior to exiting the flow regulator; and
    movement of the piston member towards and away from the base member respectively decreases and increases a cross-sectional area of the notch through which water can flow.

2. The flow regulator of claim 1, wherein the piston member is upstream to the base member.

3. The flow regulator of claim 1, wherein all water flowing through the flow regulator passes through the at least one notch.

4. The flow regulator of claim 1, wherein a decrease in the cross-sectional area of the notch through which water can flow, results from blocking an area of the notch adjacent the terminal end where the notch is shallowest.

5. The flow regulator of claim 1, further comprising biasing means configured to bias the piston member in a direction away from the base member.

6. The flow regulator of claim 1, wherein movement of the piston member towards and away from the base member is affected by water pressure upstream and water pressure downstream to an entry into the piston member.

7. The flow regulator of claim 6, wherein movement of the piston member towards the base member increases the water pressure downstream to the entry into the piston member.

8. The flow regulator of claim 6, further comprising:
a chamber located between the base member and the piston member; wherein:
water pressure downstream to the entry into the piston member and affecting movement of the piston member is substantially a pressure existing within the chamber.

9. The flow regulator of claim 8, wherein liquid communication between the chamber and a section of the flow regulator downstream to the base member, is substantially only via the at least one notch.

10. The flow regulator of claim 1, wherein the at least one notch comprises a plurality of notches.

11. A method for regulating a flow rate of water within at least a section of an irrigation system, comprising:
providing a flow regulator in accordance with claim 1, and exposing an upstream side of the flow regulator to an incoming flow of pressurized water, such that the pressurized water bears against the orifice member in a downstream direction, to thereby urge the piston member towards the base member.

12. The method of claim 11, wherein, in response to the incoming flow of pressurized water, moving only the piston member while keeping the base member fixed.

13. The method of claim 11, wherein all water flowing downstream through the regulator passes via the at least one notch.

14. The method of claim 11, wherein:
the at least one notch provides a passage therethrough that continuously decreases from a beginning end where the notch is deepest to a terminal end where the notch is shallowest; and the method comprises:
decreasing the cross-sectional area of the notch by blocking an area of the notch adjacent the terminal end where the notch is shallowest, in response to the incoming flow of pressurized water.

15. A flow regulator (24) for regulating a flow rate of water within at least a section of a water system, the flow regulator comprising:
an outer housing (26) having an upstream end (26a) and a downstream end (26b);
a base member (32) located within the outer housing (26) proximate to the downstream end, the base member comprising a core (32) having an upper side, a lower side and a periphery (324) provided with a plurality of passages (326) establishing a fluid path between the periphery (324) and the lower side;
a piston member (28) located within the outer housing (23) proximate to the upstream end, the piston member movable relative to the base member (32), the piston member comprising:
a peripheral shroud (283) surrounding an interior water passage (285) having a piston member opening (282), the peripheral shroud having a lower rim (287) comprising at least one notch (2821) configured to allow water to exit the piston member (28); and
an orifice member (30) detachably coupled to the piston member (28) and having an orifice member aperture (302) through which all water flowing through the flow regulator must pass, the orifice member aperture (302) being in fluid communication with the piston member opening (282), wherein:
movement of the piston member towards and away from the base member is adapted to, respectively, decrease and increase an available area of the at least one notch (2821) through which water exits the piston member;
the at least one notch (2821) has a circumferential beginning end (1) where a height of the notch is greatest, and a circumferential terminal end (2) where the height of the notch is smallest; and
the height of the at least one notch continuously decreases from the circumferential beginning end to the circumferential trailing end.

16. The flow regulator of claim 15, wherein the orifice member (30) is snap fitted to the piston member (28).

17. The flow regulator of claim 15, wherein the orifice member (30) at least partially overlaps and reduces a cross-sectional area of the interior water passage (285).

18. The flow regulator of claim 15, wherein:
the orifice member aperture (302) has a first area A1;
the piston member opening (282) has a second area A2; and
$A2 \geq A1$.

19. The flow regulator of claim 15, wherein:
the orifice member aperture (302) has a first diameter D1;
the piston member opening (282) has a second diameter D2; and
$D2 \geq D1$.

20. A flow regulator for regulating a flow rate of water within at least a section of a water system, the flow regulator comprising:
a base member;
a piston member movable relative to the base member, and comprising:
a piston member opening; and
at least one notch through which water flows when passing through the flow regulator; and
wherein:
the at least one notch has a circumferential beginning end where a height of the notch is greatest and a circumferential terminal end where a height of the notch is smallest;
the height of the at least one notch continuously decreases from the circumferential beginning end to the circumferential trailing end; and
movement of the piston member towards and away from the base member respectively decreases and increases a cross-sectional area of the notch through which water can flow.

21. The flow regulator of claim 20, further comprising:
an orifice member detachably attached to the piston member, the orifice member having an orifice member aperture; wherein:
the orifice member aperture (302) has a first area A1;
the piston member opening (282) has a second area A2; and
$A2 \geq A1$.

22. The flow regulator of claim 20, further comprising:
an orifice member detachably attached to the piston member, the orifice member having an orifice member aperture; wherein:
the orifice member aperture (302) has a first diameter D1;
the piston member opening (282) has a second diameter D2; and $D2 \geq D1$.

\* \* \* \* \*